UNITED STATES PATENT OFFICE.

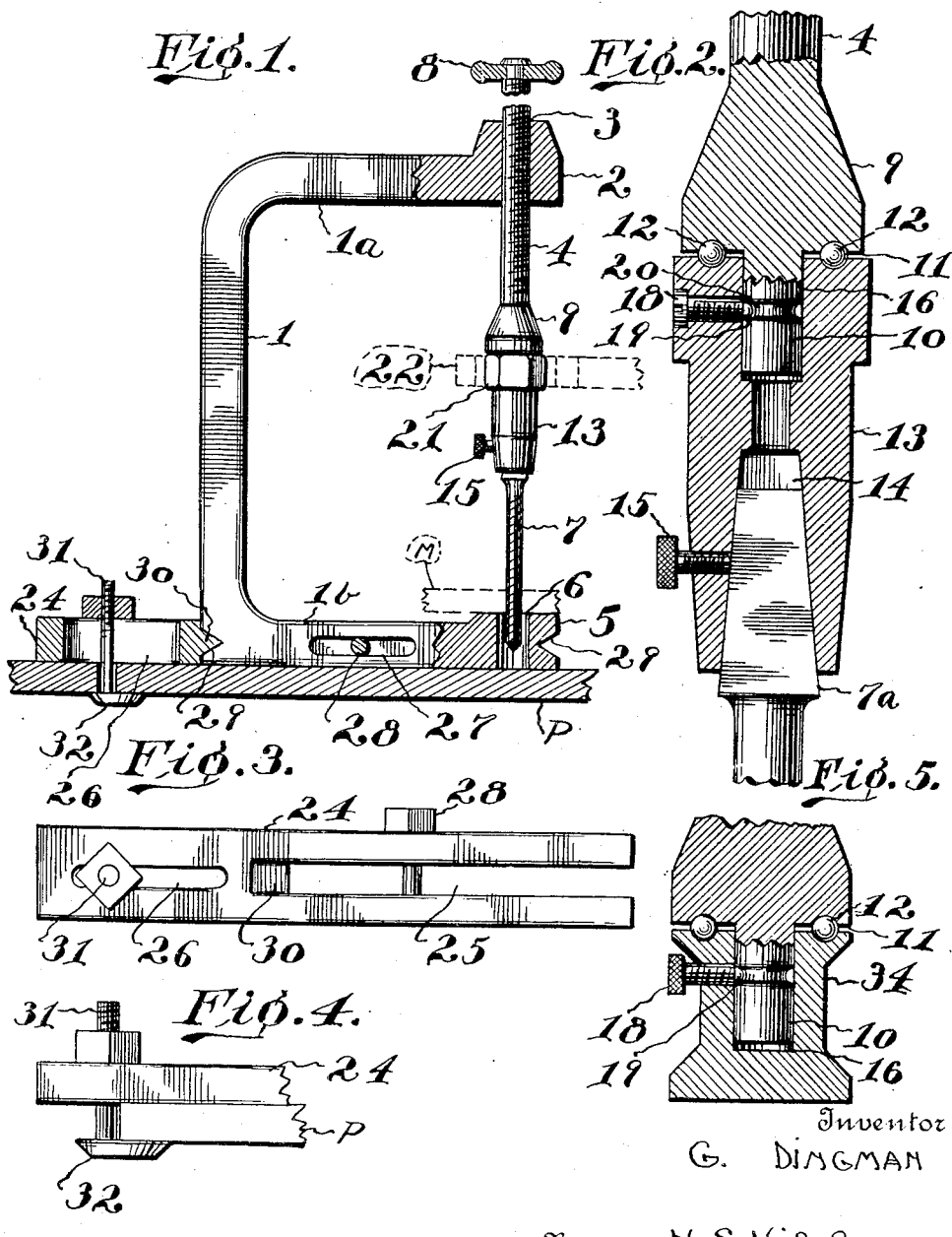

GEORGE DINGMAN, OF FLINT, MICHIGAN.

HAND CLAMP AND DRILL OUTFIT.

1,337,205.       Specification of Letters Patent.      Patented Apr. 20, 1920.

Application filed April 23, 1919. Serial No. 292,030.

*To all whom it may concern:*

Be it known that I, GEORGE DINGMAN, a citizen of the United States, residing at Flint, in the county of Genesee, State of Michigan, have invented a new and useful Hand Clamp and Drill Outfit; and I do hereby declare the following to be a full, clear, and exact description of the invention, such as will enable others skilled in the art to which it appertains to make and use the same.

The present invention relates to a hand drill, and has for it object to provide a device of this character which embodies novel features of construction whereby it can be used in confined and difficult places and will enable holes to be drilled in metal plates or members without difficulty.

Further objects of the invention are to provide a hand drill which is comparatively simple and inexpensive in its construction, which is mounted so that it can be readily attached to a plate or other member in which it is desired to drill a hole, which provides for operating the drill and feeding the bit as necessary, and which can be used to advantage for drilling a series of holes in a plate.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a drill constructed in accordance with the invention, portions being broken away and shown in section.

Fig. 2 is an enlarged sectional view through the chuck and associated parts.

Fig. 3 is a plan view of the base with the drill frame removed therefrom.

Fig. 4 is a detail view showing the manner of securing the base to the edge of a plate in which it is desired to drill an opening.

Fig. 5 is a detail view of a clamping jaw which is adapted to be substituted for the chuck when it is desired to use the device as a clamp.

Corresponding and like parts are referred to in the following description and indicated in all the views of the drawings by the same reference characters.

Referring to the drawings, the numeral 1 designates a yoke member which constitutes the drill frame, the two arms 1ª and 1ᵇ of the yoke having a substantially parallel relation, and the upper arm 1ª terminating in a head 2 formed with a threaded opening 3 which receives the feed shaft 4. The lower arm 1ᵇ of the yoke terminates in a head 5 formed with an opening 6 which is sufficiently large to provide clearance space for the drill bit 7. The feed shaft or stem 4 is provided at its upper end with a handle 8, and at its lower end with an enlarged head 9. A cylindrical pivot stud 10 projects axially downward from the head 9, and the shoulder 11 at the base of the pivot stud is provided with an annular raceway to receive the anti-friction rollers 12.

The chuck 13 is provided at its lower end with the usual tapered socket 14 within which the tapered shank 7ª of the bit is fitted and secured by a set screw 15. The upper end of the chuck is formed with a cylindrical recess or bearing 16 which engages the pivot stud 10 and holds the chuck in alinement with the feed stem 4, although it is free to rotate upon the stud. A lateral screw 18 is threaded in the upper end of the chuck and formed with a nose 19 adapted to enter an annular groove 20 in the stud 10 to retain the chuck in position upon the stud without interfering with the rotation of the chuck thereon. The upper end of the chuck is provided with a raceway to receive the anti-friction rollers 12, so that a thrust bearing is provided between the chuck and the head 9 of the feed stem. An enlarged portion 21 of the chuck has a polygonal formation and is adapted to be engaged by a conventional ratchet handle or wrench 22 for the purpose of operating the drill. The drill can thus be rotated by the ratchet handle and held in proper engagement with the work by manipulating the feed stem 4.

The yoke 1 is preferably mounted upon an elongated base 24 which is shown in detail by Fig. 3. This base is formed with a bifurcation 25 which opens through one end thereof, and a longitudinal slot 26 adjacent the other end thereof. The arm 1ᵇ of the yoke 1 is received within the bifurcation 25 and the middle portion of the arm is slotted at 27 to receive a clamping bolt 28 which connects the arms of the bifurcation. The two ends of the arm 1ᵇ of the yoke are each formed with a tapered recess 29 adapted to engage a V-shaped tongue 30 projecting inwardly from the base of the bifurcation 25. By sliding the member 1ᵇ upon the clamping bolt 28, when the latter is loosened, the notches 29 can be brought into or out of engagement with the tongue 30 and the yoke 1 revolved upon the bolt 28 to bring the drill 7 into position at the inner end of the bifurcation 25, or at the outer end thereof, as may be desired. Adjustment can thus be made for bringing the drill bit into the most convenient position for performing the work. The slot 26 receives a clamping bolt 31 which has an L-shaped head 32 adapted to be utilized for securing the base to the edge of a plate P, as indicated more clearly by Fig. 4. This bolt 31 is utilized for securing the base in position upon the plate or other member in which a hole is to be drilled, and when a series of openings are to be drilled in a plate P, the bolt 31 can be moved successively into the openings as they are drilled, thereby shifting the position of the base and drill frame in the necessary manner. The device can thus be very advantageously used for drilling a series of openings in a plate, said series of openings being either in a straight or a curved line.

In Fig. 5 is illustrated a clamping head 34 which is adapted to be substituted for the chuck 13 if it is desired to use the device as a clamp. The yoke 1 can be detached from the base 24, if desired, and the device used as a clamp in a most effective manner.

As indicated by dotted lines on Fig. 1, a piece of metal M may be placed within the U-shaped frame and caused to rest upon the head 6 of the lower arm when it is desired to drill a hole and use the tool without attaching the base thereto.

Having thus described the invention, what I claim as new and desire to secure by Letters Patent, is:—

1. An implement of the character described, including a frame formed with spaced arms, one of the arms being provided with a threaded opening and the other arm being provided with a clearance opening, a feed stem fitted in the threaded opening and terminating in a head, a chuck swiveled on the feed stem and formed with a socket to receive a drill bit adapted to operate through the clearance opening, means for operating the chuck, a base having an opening to receive an arm of the frame, a clamping bolt connecting the frame to the base and passing loosely through the frame so that when the bolt is loosened the clamping frame can be rotated to project from either side of the base, means for holding the frame rigidly in an adjusted position upon the base, and means for securing the base to the member to be drilled.

2. An implement of the character described, including a frame formed with spaced arms, one of the arms having a threaded opening therein and the other arm having a clearance opening therein, a feed stem fitted in the threaded opening and terminating in a head, a chuck swiveled upon the head and formed with a socket to receive a drill bit which is adapted to operate through the clearance opening, means for operating the chuck, a base plate bifurcated to receive an arm of the frame, a tongue projecting from the base of the bifurcation, a clamping bolt connecting the sides of the bifurcation, the arm of the frame being slotted to receive the clamping bolt and being provided at its ends with recesses, either one of which will interlock with the before mentioned tongue at the base of the bifurcation, and means for securing the base plate to a plate to be drilled.

3. An implement of the character described, including a yoke formed with spaced arms, one of the arms having a threaded opening therein while the other arm is slotted and formed with a clearance opening, a feed stem fitted in the threaded opening, a chuck swiveled on the feed stem and formed with a socket for receiving a drill bit which is adapted to operate through the clearance opening, means for operating the chuck, a base bifurcated to receive the slotted arm of the yoke and having a tongue at the base of the bifurcation, a clamping screw connecting the members of the bifurcation and received within the slot of the arm of the yoke, said arm of the yoke being formed at its ends with recesses, either one of which will interlock with the tongue with the yoke projecting from either side of the base plate, and means for securing the base plate to a plate to be drilled.

In testimony whereof I have signed my name to this specification in the presence of two subscribing witnesses.

GEORGE DINGMAN.

Witnesses:
ELMA E. EASTON,
E. LOUISE PATTERSON.